(12) United States Patent
Albers et al.

(10) Patent No.: US 6,853,868 B1
(45) Date of Patent: Feb. 8, 2005

(54) CROSS-PLATFORM AUDIO FEEDBACK FOR GUI COMPONENTS

(75) Inventors: Michael C. Albers, San Francisco, CA (US); John T. Clingan, Foundation Valley, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/418,772

(22) Filed: Oct. 15, 1999

(51) Int. Cl.[7] .............................................. G06F 17/00
(52) U.S. Cl. ...................... 700/94; 707/104.1; 345/716
(58) Field of Search ........................... 700/94; 345/716, 345/717, 727, 728, 744, 733, 866, 771, 835; 707/104.1; 709/318, 328; 381/119, 109.98

(56) References Cited

U.S. PATENT DOCUMENTS

| | | | | |
|---|---|---|---|---|
| 5,854,927 A | * | 12/1998 | Gelissen | 717/139 |
| 5,889,990 A | * | 3/1999 | Coleman et al. | 395/682 |
| 6,026,238 A | * | 2/2000 | Bond et al. | 717/141 |
| 6,044,408 A | * | 3/2000 | Engstrom et al. | 719/328 |
| 6,085,199 A | * | 7/2000 | Rose | 707/104 |
| 6,093,880 A | * | 7/2000 | Arnalds | 84/464 R |
| 6,128,011 A | * | 10/2000 | Peng | 345/335 |
| 6,226,693 B1 | * | 5/2001 | Chow et al. | 709/318 |
| 6,308,222 B1 | * | 10/2001 | Krueger et al. | 709/247 |
| 6,516,356 B1 | * | 2/2003 | Belknap et al. | 709/328 |

OTHER PUBLICATIONS

Albers, et al., "The Audible Web: Auditory Enhancements for Mosaic," *CHI '95 Mosaic of Creativity*, pp. 318–19 (1995).

Cohen, "Out to Lunch: Further Adventures Monitoring Background Activity," *Proc. Second Intl. Conf. on Auditory Display*, ICAD '94, pp. 15–20 (Nov. 1994).

Cohen, "Kirk Here: Using Genre Sounds to Monitor Background Activity," *Adjunct Proceedings of InterCHI '93*, pp. 63–64 (1993).

Cohen, "Monitoring Background Activities," *Auditory Display: Sonification, Audification, and Auditory Interfaces*, ed. G. Kramer, Santa Fe Institute Studies in the Sciences of Complexity, Proc. vol. XVIII, pp. 499–531 (1994).

Edwards, et al., An Architecture for Transforming Graphical Interfaces,' *UIST '94*, pp. 39–47 (1994).

Gaver, et al., "Effective Sounds in Complex Systems: The Arkola Simulation," *Proceedings of CHI 1991*, pp. 85–90 (1991).

Gaver, "The SonicFinder: An Interface That Uses Auditory Icons," *Human–Computer Interaction*, vol. 4, pp. 67–94 (1989).

Gaver, "Sound Support for Collaboration," *Proc. of the Second European Conf. on Computer–Supported Collaborative Work*, 10 pages (Sep. 1991).

* cited by examiner

*Primary Examiner*—Duc Nguyen
*Assistant Examiner*—Lun-See Lao
(74) *Attorney, Agent, or Firm*—Beyer Weaver & Thomas LLP

(57) ABSTRACT

Apparatus, methods and computer program products are disclosed for providing audio output in conjunction with a platform independent computer service. A software object is described which includes modular themes which can be flexibly changed in order to service multiple platforms. Each theme includes a set of platform dependent audio fields designed to run on a particular platform. Each of the set of platform dependent audio fields is associated with at least one of a set of audio events which requires audio output. In this manner, a computer service is capable of providing a platform dependent audio output by calling the platform dependent audio field corresponding to the event.

14 Claims, 9 Drawing Sheets

Hash Table (McIntosh THEME)     300

| Event | field |
|---|---|
| button mouse press | ./audio/mac/button.mouse.press.aif |
| button mouse release | ./audio/mac/button.mouse.release.aif |
| internal frame minimize | ./audio/mac/internal.frame.minimize.aif |
| internal frame maximize | ./audio/mac/internal.frame.maximize.aif |
| ... | ... |
| ... | ... |

FIG. 3A

Hash Table (Windows THEME)     330

| Event | field |
|---|---|
| button mouse press | null |
| button mouse release | null |
| internal frame minimize | ./audio/mac/internal.frame.minimize.aif |
| internal frame maximize | ./audio/mac/internal.frame.maximize.aif |
| | ... |
| | ... |

FIG. 3B

CROSS-PLATFORM AUDIO FEEDBACK FOR GUI COMPONENTS

FIELD OF THE INVENTION

The present invention relates to the field of computing, and more particularly, to software, methods and systems which allow audio functionality for various graphical user interface (GUI) look and feel components in Java.

BACKGROUND OF THE INVENTION

In recent years significant efforts have been made to facilitate the creation of platform independent software. That is, software that can execute on multiple platforms (e.g. different types of computer or operating systems), without requiring the software program to be rewritten or customized to operate on specific platforms. By way of example, the Java programming language is designed to facilitate the creation of Java software objects that are platform independent. However, in certain situations, it is desirable for a particular software object to make use of platform dependent code to provide a particular functionality. One such platform dependent functionality used by software objects is an audio function.

An audio function represents software used to enable the communication of sound between a computer system and a user. For example, in a graphical user interface environment (GUI), a sound may be used to communicate an event such as opening, dragging or closing a window.

There has been a great deal of work on various Java technologies to ensure seamless integration with the underlying platform, architecture or operation system (OS). If a program is truly seamlessly integrated, a person that is executing a Java program on a particular platform should not be able to distinguish a Java program from a native one. Stated slightly differently, the user's experience should be the same whether the application is created using Java code or native code. The most significant aspect of the user's experience is typically the GUI "look and feel". More specifically, for a particular GUI event, the user expects the same response from the Java program as a native one.

The JAVA Foundation classes (JFC's), including the Swing component set, is one way to ensure seamless integration with the underlying platform. Swing provides many standard GUI components such as buttons, lists, menus, and text areas, and also includes event-handling methods of how a program responds to external events. Having separate data and state models makes the Swing components highly customizable, and enables sharing data between components. Further, Swing offers many features including support for icons, actions, Pluggable Look & Feel (PLAF) technology, assistive technologies, and separate models. Swing's Pluggable Look & Feel architecture gives the user a wide choice of look-and-feel options. In addition to the usual platform-specific looks and feels, the user can also use the Java Look & Feel, add an accessory look and feel, or use a third-party look and feel.

FIG. 1 illustrates a conventional software configuration 100 of objects concerned with look and feel (L&F) issues inside a running Swing application. The conventional software configuration 100 includes a component 102, a UI Manager 104, and a primary L&F 106. These three objects communicate to arrive at an appearance and behavior for the component 102. The component 102 may be any widget whose actions may utilize or lead to an event, i.e. a button which closes a window producing a particular sound.

The UI Manager 104 is a resource that allows communication between all the different parts of the conventional software configuration 100. The L&F being used is generally considered the primary L&F 106. This primary L&F 106 is either the L&F which emulates the underlying L&F or it is the cross-platform Java L&F (JLF). By way of example, a JLF representation of a Metal L&F is the primary L&F 106 for the conventional software configuration 100. The current L&F is the one implemented by the UI Manager 104. Conventionally, the current L&F is the same as the primary L&F.

To facilitate the applicability of Swing, each emulated look and feel, such as the Windows L&F and the Motif L&F, must appear and behave like the native platform. A growing number of important Java platforms rely on audio cues to inform users of interaction and system activities. Unfortunately, there is no mechanism for providing platform dependent audio functionality in the JFC. By way of example, conventional audio events within a L&F are not applicable to Swing.

In view of the foregoing, it should be apparent that a mechanism which allows audio functionality on platform dependent software the JFC would be desirable.

SUMMARY OF THE INVENTION

The invention relates, in accordance with one embodiment to an audio computer service. The service includes a system manager. The system also includes a component capable of an audio event designed to run on a first platform serviced by the audio computer service. The system further includes a software object having a set of entries wherein one entry is associated with the audio event and a theme including a first set of platform dependent audio fields, each platform dependent audio field associated with at least one audio event of the set of audio events, wherein the theme is arranged to permit the emulation the audio events of the first platform.

In another embodiment, the invention relates to a computer-implemented method of accessing, by a computer service, a platform dependent audio field associated with an audio event on a first platform. The method includes receiving a request for a platform dependent audio file. The method also includes importing a theme corresponding to the platform dependent audio file including at least one platform dependent audio field associated with the audio event. The method further includes referencing the platform dependent audio field corresponding to the audio event from the theme. The method may also include providing audio output associated with the platform dependent audio field.

In yet another embodiment, the invention relates to a software object for servicing audio events for a computer service. The object including of a first set of platform dependent fields capable of facilitating audio output a first platform. The object also including a set of audio events, wherein each audio event is associated with at least one platform dependent field of the first set of platform dependent fields. In addition, the first set of platform dependent fields are included in a first theme which relates the first set of platform dependent fields for the first platform to the set of audio events.

BRIEF DESCRIPTION OF THE DRAWINGS

The invention will be better understood by reference to the following description taken in conjunction with the accompanying drawings in which:

FIGS. 3A and 3B illustrate exemplary hash tables applicable with the present invention.

DETAILED DESCRIPTION OF THE DRAWINGS

The present invention will now be described in detail with reference to the preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

A Pluggable L&F (PLAF) apparatus and method is described which emulates the audio functionality of multiple platforms. The platform may be a L&F, operating system (OS) or any other GUI environment. A single audio PLAF with multiple L&F audio functionality is referred to as an Audio L&F (ALF). The Audio L&F includes a set of themes wherein each theme corresponds to the audio functionality for a particular platform. The theme includes a number of entries wherein each entry provides a mapping between an audio event for a GUI component and the respective audio output.

The Audio L&F apparatus and method may be implemented in Java. In one embodiment, audio functionality may be implemented by utilizing the conventional PLAF architecture of the Swing components. In another embodiment, the Audio L&F defines and implements additional infrastructure to Java components to permit audio functionality. For example, a Multiplexer may be used to present a single audio L&F as well as taack and facilitate primary L&F changes. In another embodiment of the present invention, the Audio L&F allows the creation of advanced audio user interfaces in Swing to facilitate new applications on the Java platform.

The present invention provides reinforcement of GUI activity through audio cues. Advantageously, a cross-modality communication of information may be provided to decrease the users' visual load. Further, the present invention permits a flexible alternate presentation of pertinent information as well as utilization of real-world sounds which leverages the users' knowledge of their environment.

Additionally, the present invention allows integration of Swing applications into their existing native environments to increase the perceived quality of Java applications. Providing the audio cues that the user expects form their native environment may more fully integrate Java applications into a user's interaction experience. In addition, adding audio feedback to an interface may increase the perceived quality of the application itself.

Figure 2:
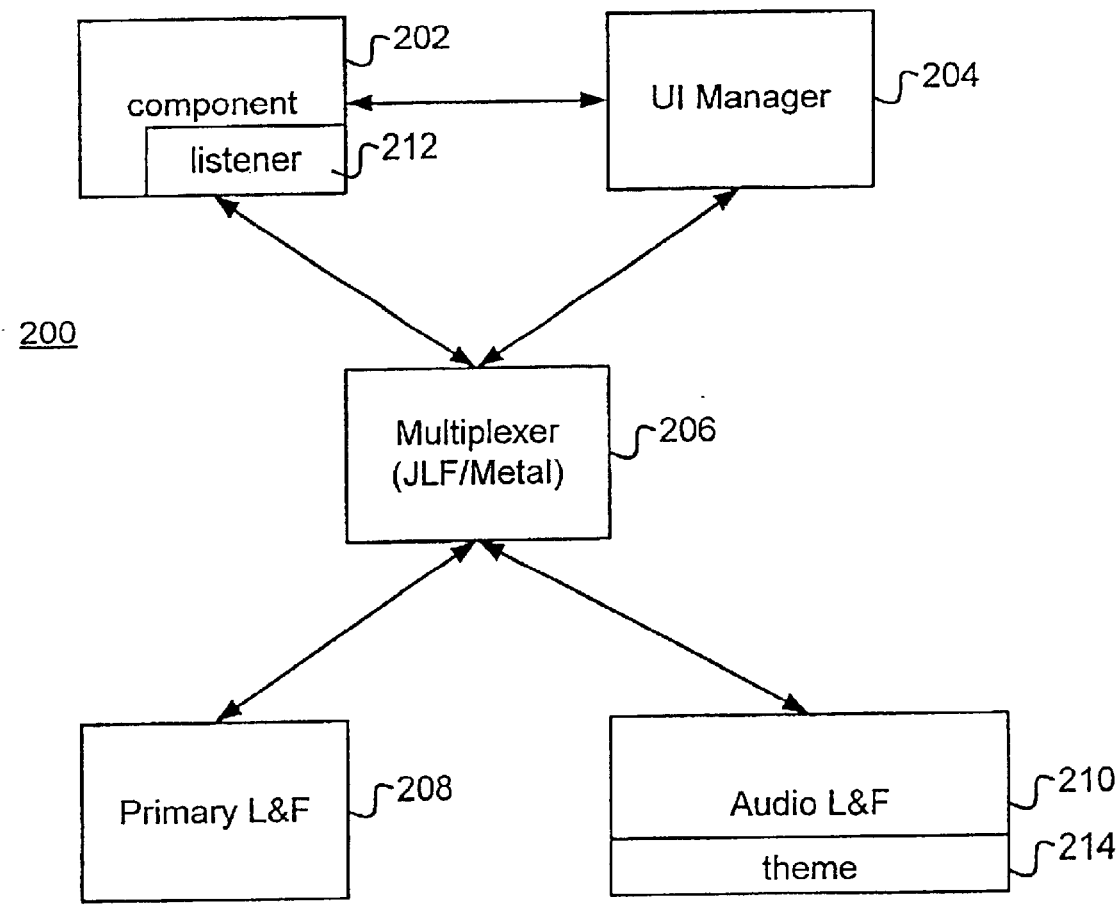
FIG. 2 illustrates an audio L&F software configuration 200 inside a running Swing application in accordance with one embodiment of the present invention.

FIG. 2 illustrates an audio L&F software configuration 200 inside a running Swing application in accordance with one embodiment of the present invention. The Swing toolkit is included in the Java Foundations Classes (JFC). The software configuration 200 includes a component 202, a UI Manager 204, a Multiplexer 206, a primary L&F 208 and an Audio L&F 210. These objects communicate to provide audio behavior for the component 202.

The component 202 may be any widget or GUT object whose actions may utilize or lead to an audio event. For example, the component 202 may be a button, scroll bar, frame, etc. The audio event may be any action by the component 202 which leads to an audio output or function between the computer and the user. By way of example, the event may be the movement of a slider, dragging a GUT object or any other user interface action performed by the component 202. The component 202 may also be capable of multiple events. By way of example, a mouse button may have over forty audio events within a particular L&F.

A L&F will generally define the user interface for any known component 202 within the L&F. As a result, there will generally be a portion of code responsible for the component 202. The code will determine the look of the component 202 as well as actions and events performed by the component 202. Attached to this code, a listener 212 may be added for facilitating communication within the audio L&F software configuration 200. The listener 212 may be considered a sensor to an event or action for the component 202.

Since the component 202 typically only interacts with a single L&F, the Multiplexer 206 may be used to manage requests and events for multiple and simultaneous L&Fs. To handle the multiple L&Fs, the Multiplexer 206 acts an interface between the component 202 and the current L&F to allow communication therebetween.

Conventionally, the primary L&F 208 is the same as the current L&F. With the addition of the Multiplexer 206, the primary L&F 208 may be differentiated from an auxiliary L&F, such as the Audio L&F 210. In this manner, one primary L&F 208 is still maintained, however, there may be a number of auxiliary L&Fs wherein the current L&F is the L&F represented by the Multiplexer 206.

The UI Manager 204 is a resource that allows communication between the different entities in the audio L&F software configuration 200. By way of example, an application which requires information about or a change in the primary L&F 208 does so through the UI Manager 204.

To emulate the audio output for multiple L&Fs, the Audio L&F 210 includes a theme 214 for each L&F it is responsible for. The theme 214 may be considered a set of audio cues that map onto the audio events in the user interface. Alternately, the theme 214 may be a set of fields, common to a particular L&F, each of which associates with at least one event for the component 202. Within a field there may be a pointer or suitable structure responsible for facilitating the audio output for the associated event. The theme structure within the Audio L&F 210 allows the cues for the audio events to be replaced for a L&F without replacing the L&F itself.

For the audio L&F software configuration 200, the Audio L&F 210 typically corresponds to the primary L&F 208 currently installed and running on the user interface. When the primary L&F 208 is changed, the Audio L&F 210 loads the appropriate theme for the new L&F. In one embodiment, the Audio L&F 210, by attending a listener to the UI Manager 204, is notified when the Multiplexer 206 changes the primary L&F 208.

There may be multiple audio mechanisms within the audio L&F software configuration 200. When the UI Manager 204 is requested to plug in the Audio L&F 210 as an auxiliary L&F, the Audio L&F 210 may become the primary audio mechanism among the multiple audio output mechanisms. Thus, in accordance with the pluggable L&F nature of the invention, the Audio L&F 210 may be turned on/off as required and may be present in the computer system without being continuously active. In another embodiment, the Audio L&F 210 may be implemented as a L&F which is not plugged in and out unless there is no audio output for the computer system.

The platform independent audio functionality of the present invention can be achieved by emulating any pluggable or auxiliary L&F. For example, five commonly used PLAFs include the Motif L&F, MacIntosh L&F, Windows L&F, Java L&F and the Multiplexer 206. The MacIntosh L&F, Motif L&F, and Windows L&F all extend the Basic L&F to take advantage of Basic's built-in event handling and generic painting code. In a preferred embodiment of the present invention, the Audio L&F 210 does not extend Basic. In this case, the Audio L&F 210 will extend the PLAF directly to allow special event handling and zero painting. To facilitate emulation of the audio functionality of each of the L&Fs, each pluggable or auxiliary L&F may be notified when the Multiplexer 206 changes the primary L&F 208 or when a new theme is swapped.

The Audio L&F 210 and supporting theme structure may be implemented in any suitable software manner. FIG. 3A illustrates an exemplary hash table 300 used to correlate audio events with audio output in accordance with the present invention. The hash table 300 contains a set of entries in which an entry includes an event 302 corresponding to a field 304. For example, the entry 306 includes an event of pressing a mouse button 308 within a MacIntosh L&F.

The field 304 may include a pointer or code which may lead to any suitable file or information capable of providing audio output from the computer system. The file may be an audio file, mini-file, algorithm, etc. Alternately, the pointer may lead to a Java object, a Java speech synthesis engine file, or part thereof. By way of example, for the event of pressing the left mouse button over a button 308, the field 312 includes a pointer which leads to a file designated as "./audio/mac/button.mouse.press.aif".

Typically, the UI Manager 204 may keep track of the hash table 300, the themes installed, many of the generic names for the components and other protocols relevant to the software configuration 200. The structure of the hash table 300 and entries may be any such structure for suitably carrying out the proposed invention. In the Swing embodiment, the hash table 300 is a UI defaults table. For a more detailed description of Java applications, the reader is referred to "Graphic Java 2, Volume II: Swing" ISBN 0-13-079667-0.

The location of the hash table 300 may vary. For example, the hash table 300, or any part thereof, may be stored locally to prevent computationally expensive returns to a non-local hash table. Alternately, the hash table 300 may be located in non-volatile memory. In one embodiment, when a UI is installed, the hash table 300 is built and the fields are updated locally. In this manner, a local cache is stored of the default table values, facilitating the processing of the audio information. In one Swing embodiment, the audio files used by the Audio L&F 210 may be instantiated to enhance the load time for activating the Audio L&F 210.

It should be noted that new or alternative forms of audio events not existing in a current L&F may be added to the hash table 300. In this case, a new entry may be added for the new event as well as a corresponding new field. In addition, listeners may be added to the respective component responsible for the new event. In this manner, audio features of new versions of a L&F may be easily adapted to the present invention.

FIG. 3B illustrates an alternate hash table 330 for use with the present invention. The alternate hash table 330 includes all the events of the hash table 300 but has been replaced by fields for a Window L&F theme. In this case, is important to note that some of the entries in the hash table 330 include null fields 332 and 334. Generally, if a field is not null, an audio output will be taken for the action.

The events that may lead to an audio output may vary drastically from platform to platform. Typically, to translate between Java and a particular L&F, the relevant audio events are determined as well as the corresponding output. From this point, the theme and hash table may be built from the relevant audio events within the particular L&F. Thus, within the Audio L&F 210, the event 308 may then be associated with multiple themes. In this manner, the event 308 is capable of running on as many platforms as supported by the available themes. By way of example, the event 308 may associate with a library of fields individually corresponding to a particular operating system including Windows NT, Win32, UNIX, etc.

Since the Audio L&F 210 is a general mechanism for L&F specific audio generation, the opportunity may arise to provide audio cues for a large number of different types of UI events. As an aid to solving the problem of providing audio cues in a coherent manner, it may be helpful to decompose the possible audio events in an organized manner within the hash table 300. For example, it may be useful to separate audio events into categories belonging to an interaction taxonomy. These categories will also help during the creation of audio cues by providing a guide as to which sounds should be similar to the others within the same category or sub-category.

In a preferred embodiment, two main categories of audio events are implemented: user actions and system activities. User actions are best described as anything that the user does that causes a change in the user interface. System activities are processes that are initiated by the machine(s) with which the user is interacting with. This machine may be the machine in front of the user or a machine physically distant on a network, for example. Alternately, system activities may be the user actions of another user. In other words, system activities are audio events that are not user actions.

Figure 4:
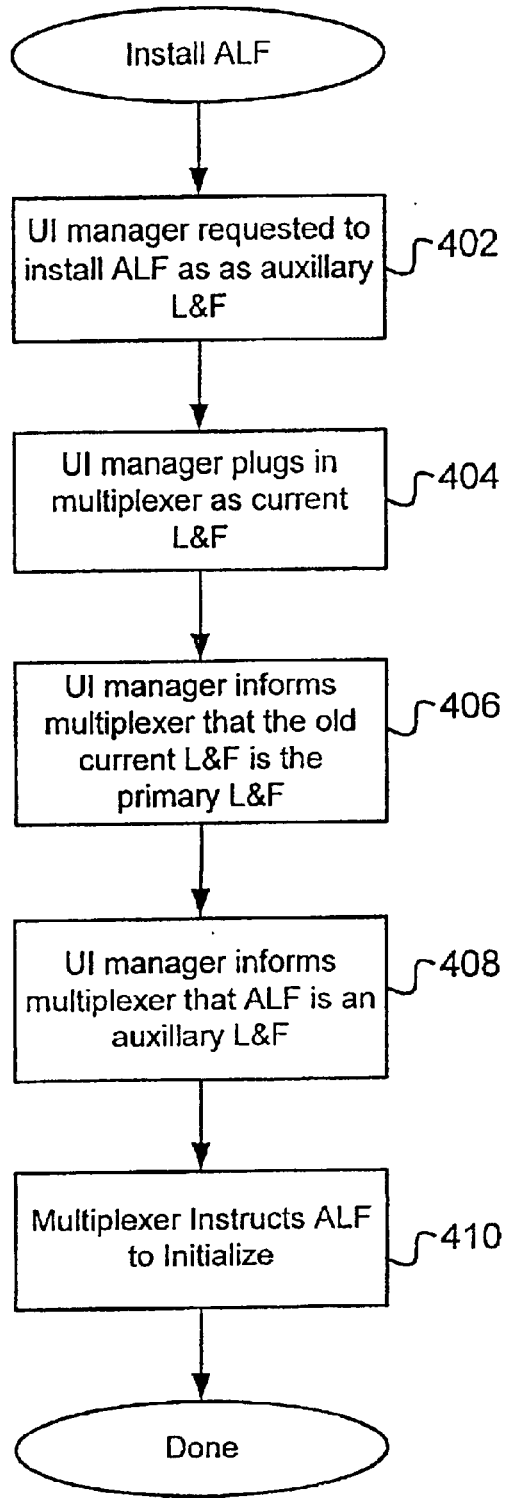
FIG. 4 is a flowchart detailing a process for installing the Audio L&F in accordance with an embodiment of the invention.

A process of implementing the Audio L&F 210 within the audio L&F software configuration 200 will now be described with respect to FIGS. 4–7. FIG. 4 is a flowchart detailing a process 400 for installing the Audio L&F 210 onto a L&F in accordance with an embodiment of the invention. It should be noted that the process 400 is applicable to any platform dependent software.

The process 400 begins with a request for the UI Manager 204 to install the Audio L&F 210 as the auxiliary L&F (402).

Figure 1:
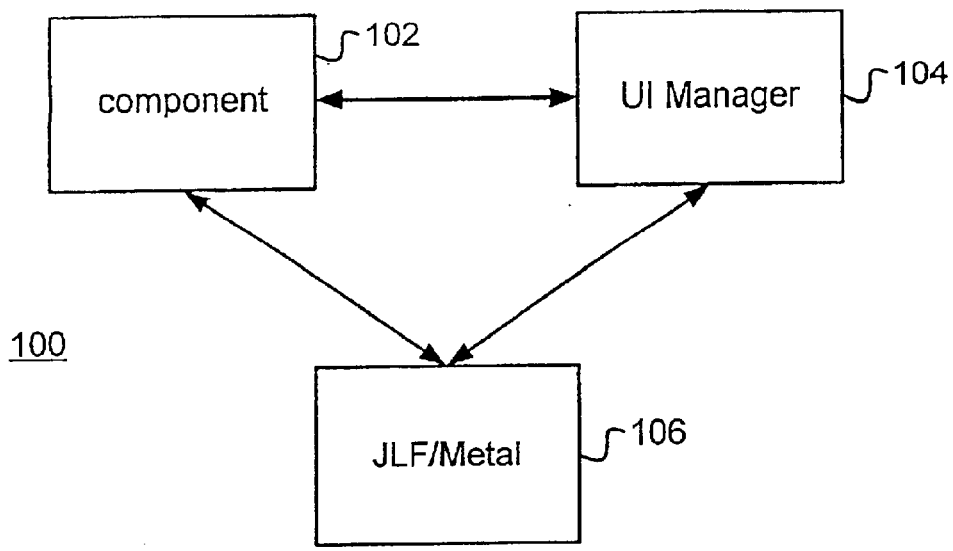
FIG. 1 illustrates a conventional software configuration 100 of objects concerned with L&F issues inside a running Swing application.

Typically, the system is established and the UI Manager 204 is aware of a primary L&F already installed (FIG. 1A). As there is more than one L&F available, the UI Manager 204 adds the Multiplexer 206. In addition, the UI Manager 204 sets the Multiplexer 206 as the current L&F (404). At this point, the current L&F and the primary L&F are not the same. Thus, the UI Manager 204 informs the Multiplexer 206 that the old current L&F is now the primary L&F (406). In addition, the UI Manager 204 also informs the Multiplexer 206 that the Audio L&F 210 is an auxiliary L&F (408). Finally, the Multiplexer 206 instructs the Audio L&F 210 to initialize (410) according to process 500.

Figure 5:
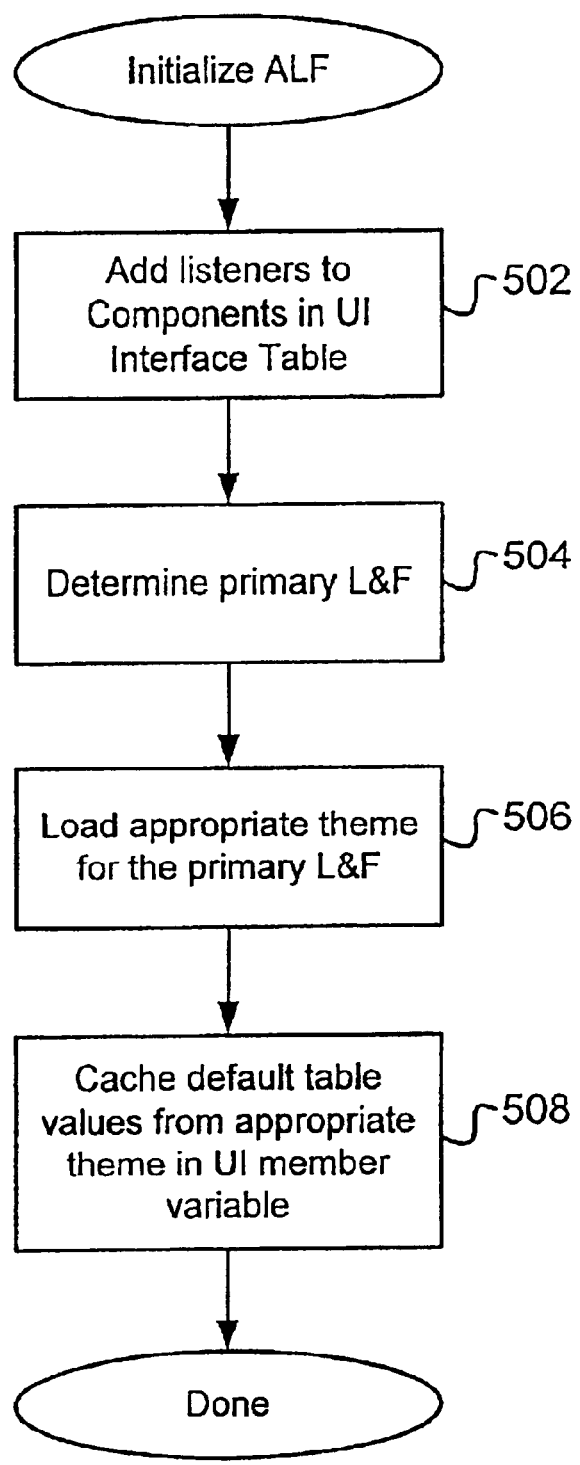
FIG. 5 illustrates a process of initializing the Audio L&F in accordance with one embodiment of the present invention.

FIG. 5 illustrates a process 500 of initializing the Audio L&F 210 in accordance with one embodiment of the present invention. The process begins with establishing a connection between the Audio L&F 210 and the components in a platform whose actions may lead to audio output. To accomplish this, Audio L&F 210 may add a series of listeners (502) to the pertinent components of the computer system. In this manner, upon an event for the component 202, or when values within the component 202 change, the UI Manager 204 is signaled of the event. At this point, the process 500 determines the primary L&F (504) and loads the appropriate theme (506) for the primary L&F. The process 500 then caches the hash table 300 values from the appropriate theme in the UI member variable (508). The UI member variable refers to the memory space for the current theme which stores the information of the audio output which is to be played.

Figure 6:
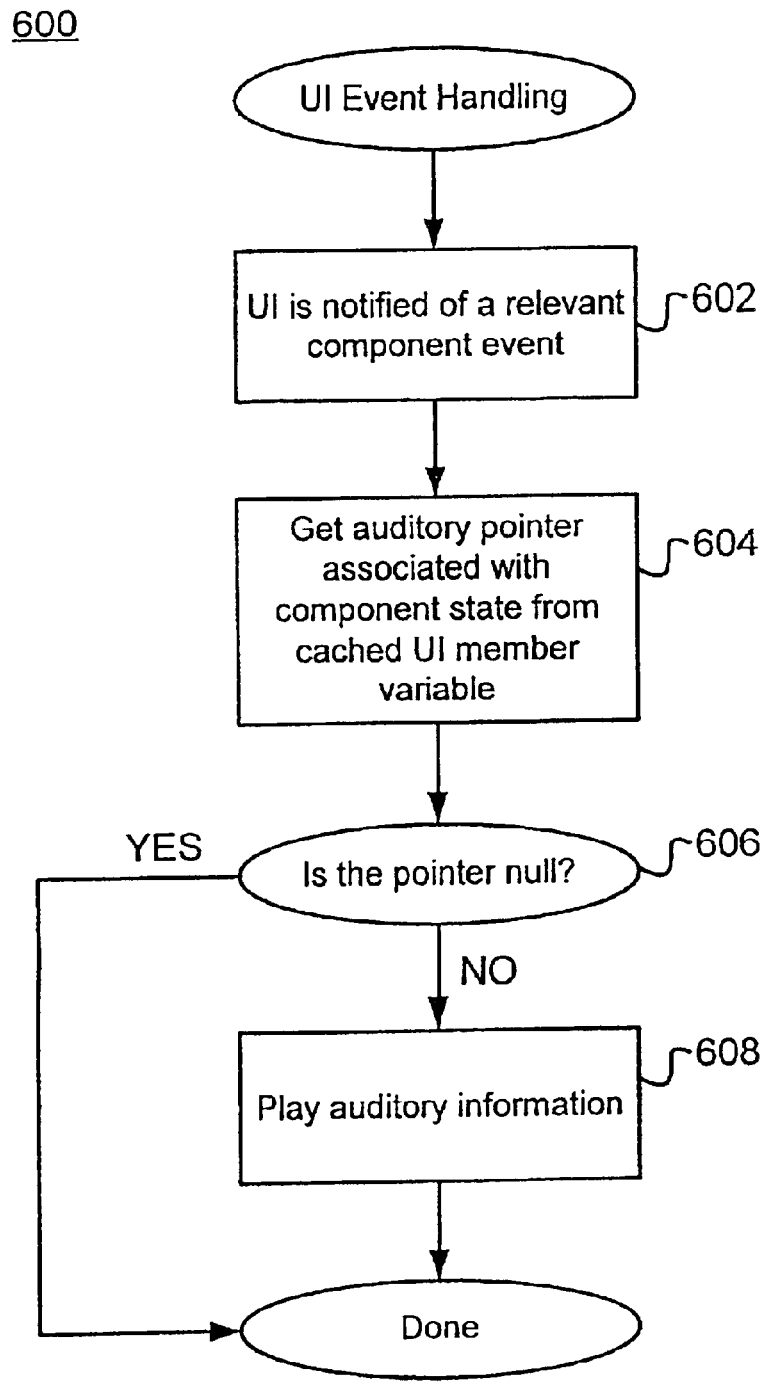
FIG. 6 is a flowchart detailing a process in which an audio event is processed.

FIG. 6 is a flowchart detailing a process 600 in which the UI Manager 204 processes an audio request. The process 600 begins by the component 202 signaling an event leading to notification of the UI Manager 204 using the listeners (602). Once the event has been received, a check may be made to the state of the component 202. This check determines which particular action of the possible actions for the component requires the audio output. For example, if the mouse button is pressed, the action may be opening or closing a window and thus a check is made to determine whether the window is currently open or closed. Correspondingly, based on the component 202 and its respective state, the appropriate audio pointer associated with the action is retrieved from the hash table 300 (604). If the pointer is null (606), no sound will be played. Otherwise, the appropriate audio information corresponding to the pointer is processed (608).

Figure 7:
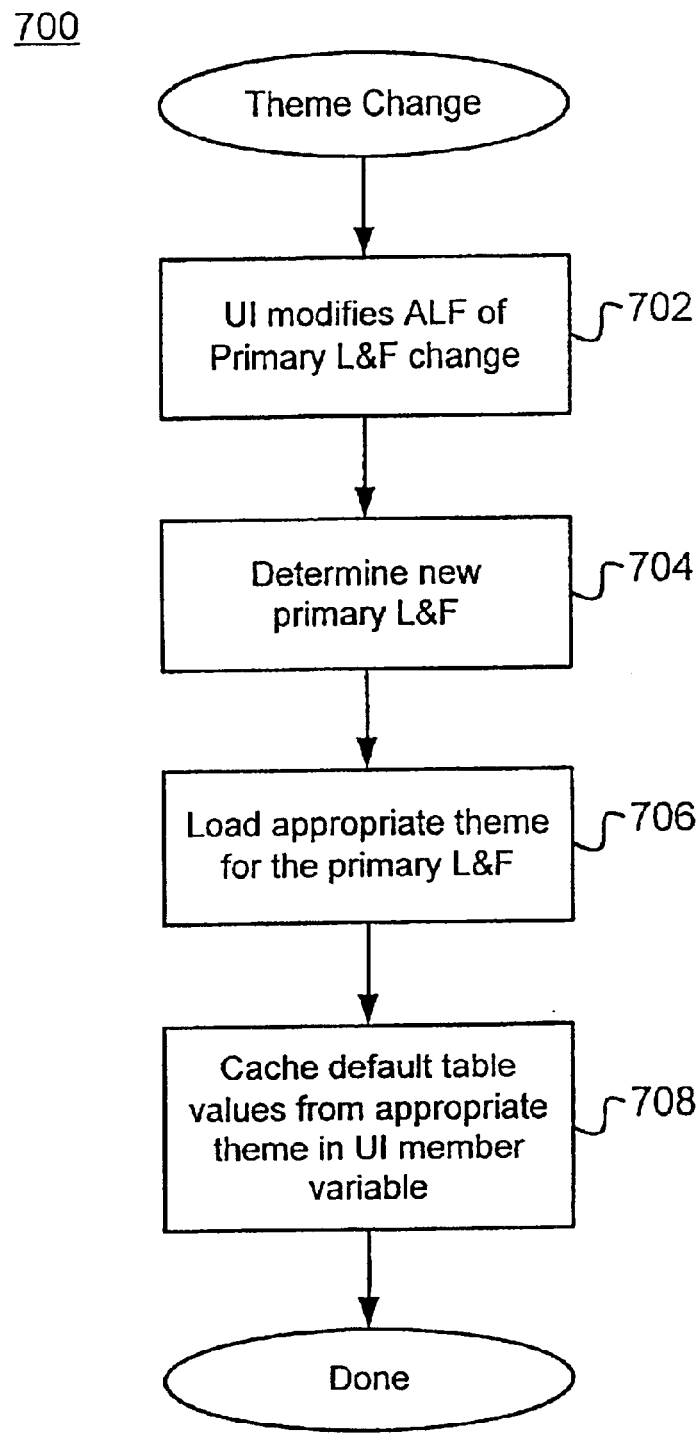
FIG. 7 is a flowchart illustrating a theme change in accordance with one embodiment of the present invention.

The present invention allows L&Fs to be switched on the fly. For example, if a user desires to switch from a MacIntosh L&F to a Motif L&F, this may be accomplished while the application is running. FIG. 7 is a flowchart illustrating a theme change 700 in accordance with one embodiment of the present invention which permits audio platform changes on the fly. The process 700 generally begins when the UI Manager 204 notifies the Audio L&F 210 of a primary L&F change (702). Typically, the UI Manager 204 has already notified the Multiplexer 206 that an auxiliary L&F is required in which the Audio L&F 210 is currently operating. At this point, the process determines the new primary L&F (704) and loads the appropriate theme for the new primary L&F (706). The process 700 then renews the caches of the hash table fields for the new theme (708).

In one embodiment of the present invention, existing technology is used apart from the Audio L&F 210 infrastructure and Multiplexer 206. The existing technology may include a PLAF mechanism, its default table infrastructure, corresponding themes mechanism, the existing event mechanism, the accessibility infrastructure, and the existing audio support in Java2.

Alternately, the present invention may require new functionality. For example, multiple classes may be created and implemented as layers on top of the existing audio infrastructure to further abstract the audio functionality within the Audio L&F 210. In a specific embodiment, the Audio L&F 210 UI classes were created for a large number of Swing components. By way of example, the Audio L&F 210 UI classes were added for the following components: Jbutton, JcheckBox, JtoggleButton, JmenuBar, JmenuItem, JcheckBoxMenuItem, JradioButtonMenuItem, Jtree, Jtable, JInternalFrame and JoptionalPane.

The present invention may employ various computer-implemented operations involving information stored in computer systems. These operations include, but are not limited to, those requiring processing of audio files and output. Usually, though not necessarily, these files take the form of electrical or magnetic signals capable of being stored, transferred, combined, and otherwise manipulated. It is sometimes convenient, principally for reasons of common usage, to refer to these electrical or magnetic signals as bits, values, elements, variables, characters, or the like. It should remembered, however, that all of these and similar terms are to be associated with the appropriate audio output and are merely convenient labels applied to these output.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general purpose computers may be used with programs written in accordance with the teachings herein, or, alternatively, it may be more convenient to construct a more specialized computer system to perform the required operations.

Figure 8:
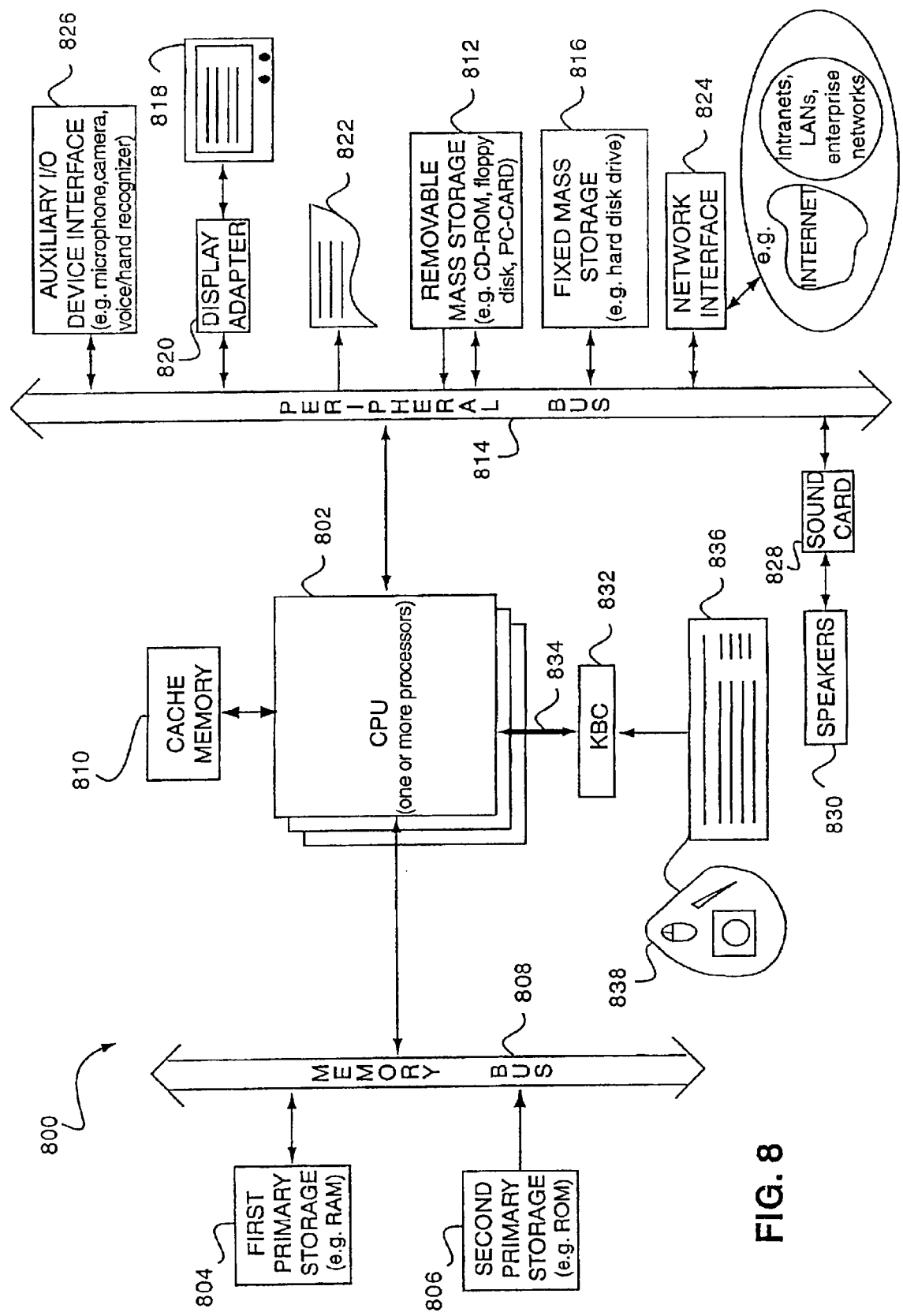
FIG. 8 is a block diagram of a typical computer system suitable for implementing an embodiment of the present invention.

FIG. 8 is a block diagram of a general purpose computer system 800 suitable for carrying out the processing in accordance with one embodiment of the present invention. For example, JVM 907, virtual machine 911, or bytecode compiler 903 can run on general purpose computer system 800. FIG. 8 illustrates one embodiment of a general purpose computer system. Other computer system architectures and configurations can be used for carrying out the processing of the present invention. Computer system 800, made up of various subsystems described below, includes at least one microprocessor subsystem (also referred to as a central processing unit, or CPU) 802. That is, CPU 802 can be implemented by a single-chip processor or by multiple processors. CPU 802 is a general purpose digital processor which controls the operation of the computer system 800. Using instructions retrieved from memory, the CPU 802 controls the reception and manipulation of input information, and the output and display of information on output devices.

CPU 802 is coupled bi-directionally with a first primary storage 804, typically a random access memory (RAM), and uni-directionally with a second primary storage area 806, typically a read-only memory (ROM), via a memory bus 808. As is well known in the art, primary storage 804 can be used as a general storage area and as scratch-pad memory, and can also be used to store input data and processed data. It can also store programming instructions and data, in addition to other data and instructions for processes operating on CPU 802, and is typically used for fast transfer of data and instructions bi-directionally over memory bus 808. Also, as is well known in the art, primary storage 806 typically includes basic operating instructions, program code, data and objects used by the CPU 802 to perform its functions. Primary storage devices 804 and 806 may include any suitable computer-readable storage media, described below, depending on whether, for example, data access needs to be bi-directional or unidirectional. CPU 802 can also directly and very rapidly retrieve and store frequently needed data in a cache memory 810.

A removable mass storage device 812 provides additional data storage capacity for the computer system 800, and is coupled either bi-directionally or uni-directionally to CPU 802 via a peripheral bus 814. For example, a specific removable mass storage device commonly known as a CD-ROM typically passes data uni-directionally to the CPU 802, whereas a floppy disk can pass data bi-directionally to the CPU 802. Storage 812 may also include computer-readable media such as magnetic tape, flash memory, signals to embodied in a carrier wave, Smart Cards, portable mass storage devices, and other storage devices. A fixed mass storage 816 also provides additional data storage capacity and is coupled bi-directionally to CPU 802 via peripheral bus 814. Generally, access to these media is slower than access to primary storages 804 and 806. Mass storage 812 and 816 generally store additional programming instructions, data, and the like that typically are not in active use by the CPU 802. It will be appreciated that the information retained within mass storage 812 and 816 may be incorporated, if needed, in standard fashion as part of primary storage 804 (e.g. RAM) as virtual memory.

In addition to providing CPU 802 access to storage subsystems, the peripheral bus 814 is used to provide access to other subsystems and devices as well. In the described embodiment, these include a display monitor 818 and adapter 820, a printer device 822, a network interface 824, an auxiliary input/output device interface 826, a sound card 828 and speakers 830, and other subsystems as needed.

The network interface 824 allows CPU 802 to be coupled to another computer, computer network, or telecommunications network using a network connection as referred to. Through the network interface 824, it is contemplated that the CPU 802 might receive information, e.g., objects, program instructions, or bytecode instructions from a computer in another network, or might output information to a computer in another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 802 can be used to connect the computer system 800 to an external network and transfer data according to standard protocols. That is, method embodiments of the present invention may execute solely upon CPU 802, or may be performed across a network such as the Internet, intranet networks, or local area networks, in conjunction with a remote CPU that shares a portion of the processing. Additional mass storage devices (not shown) may also be connected to CPU 802 through network interface 824.

Auxiliary I/O device interface 826 represents general and customized interfaces that allow the CPU 802 to send and, more typically, receive data from other devices. Also coupled to the CPU 802 is a keyboard controller 832 via a local bus 834 for receiving input from a keyboard 836 or a pointer device 838, and sending decoded symbols from the keyboard 836 or pointer device 838 to the CPU 802. The pointer device may be a mouse, stylus, track ball or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. Examples of computer-readable media include, but are not limited to, all the media mentioned above, including hard disks, floppy disks, and specially configured hardware devices such as application-specific integrated circuits (ASICs) or programmable logic devices (PLDs). The computer-readable medium can also be distributed as a data signal embodied in a carrier wave over a network of coupled computer systems so that the computer-readable code is stored and executed in a distributed fashion.

It will be appreciated by those skilled in the art that the above described hardware and software elements are of standard design and construction. Other computer systems suitable for use with the invention may include additional or fewer subsystems. In addition, memory bus 808, peripheral bus 814, and local bus 834 are illustrative of any interconnection scheme serving to link the subsystems. For example, a local bus could be used to connect the CPU to fixed mass storage 816 and display adapter 820. The computer system referred to in FIG. 8 is but an example of a computer system suitable for use with the invention. Other computer architectures having different configurations of subsystems may also be utilized.

Figure 9A:
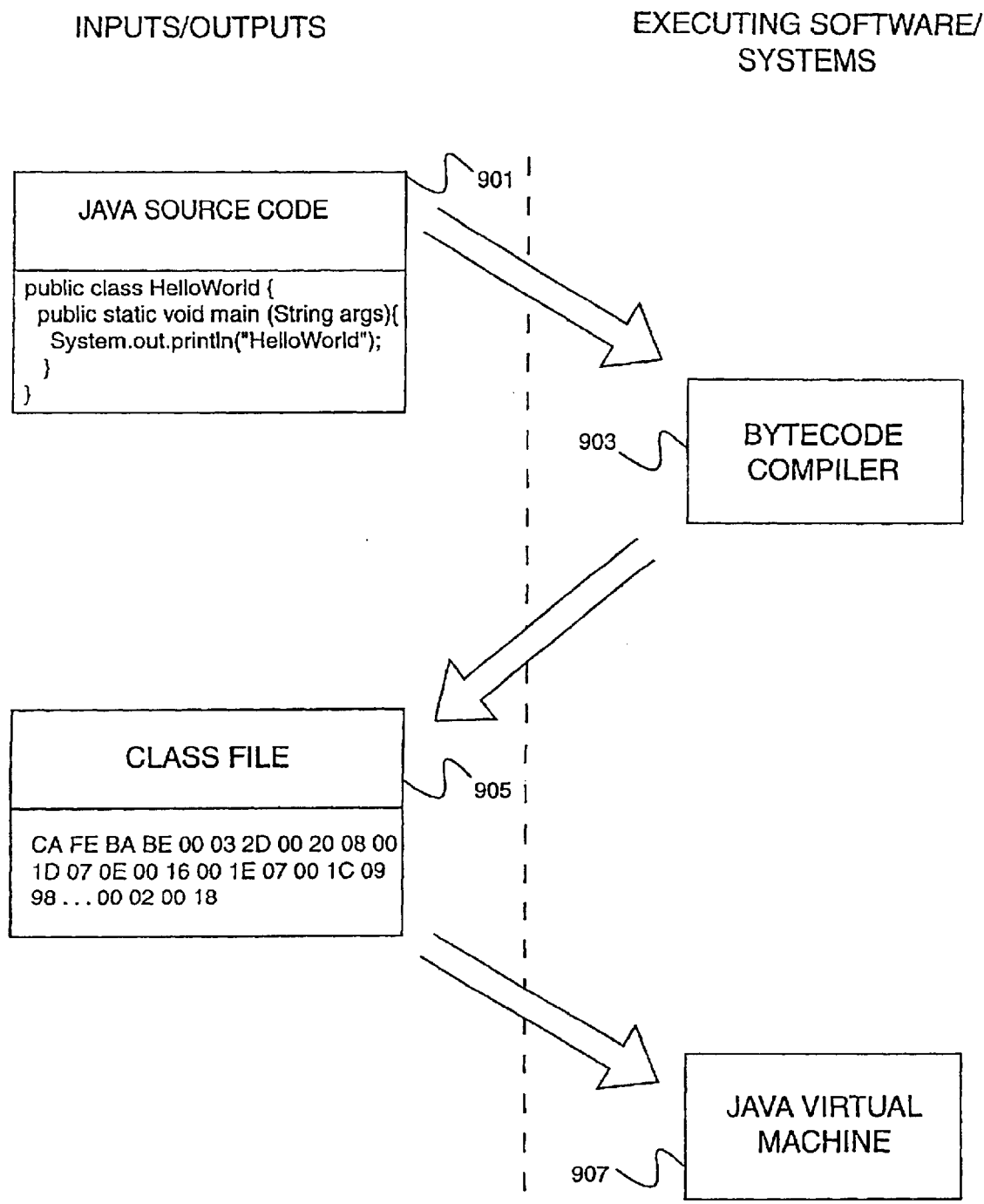
FIG. 9a is a block process diagram illustrating the transformation of a Java™ program containing Java source code to native code to be run on a particular platform or computer.

FIG. 9a is a block diagram showing the inputs/outputs and the executing software/systems involved in creating native instructions from Java source code in accordance with one embodiment of the present invention. In other embodiments, the present invention can be implemented with a virtual machine for another language or with class files other than Java class files. Beginning with the left side of the diagram, the first input is Java source code 901 written in the Java™ programming language developed by Sun Microsystems of Mountain View, Calif. Java source code 901 is input to a bytecode compiler 903. Bytecode compiler 903 is essentially a program that compiles source code 901 into bytecodes. Bytecodes are contained in one or more Java class files 905. Java class file 905 is portable in that it can execute on any computer that has a Java virtual machine (JVM). Components of a virtual machine are shown in greater detail in FIG. 9B. Java class file 905 is input to a JVM 907. JVM 907 can be on any computer and thus need not be on the same computer that has bytecode compiler 903. JVM 907 can operate in one of several roles, such as an interpreter or a compiler. If it operates as a compiler, it can further operate as a "just in time" (JIT) compiler or as an adaptive compiler. When acting as an interpreter, the JVM 907 interprets each bytecode instruction contained in Java class file 905.

Figure 9B:
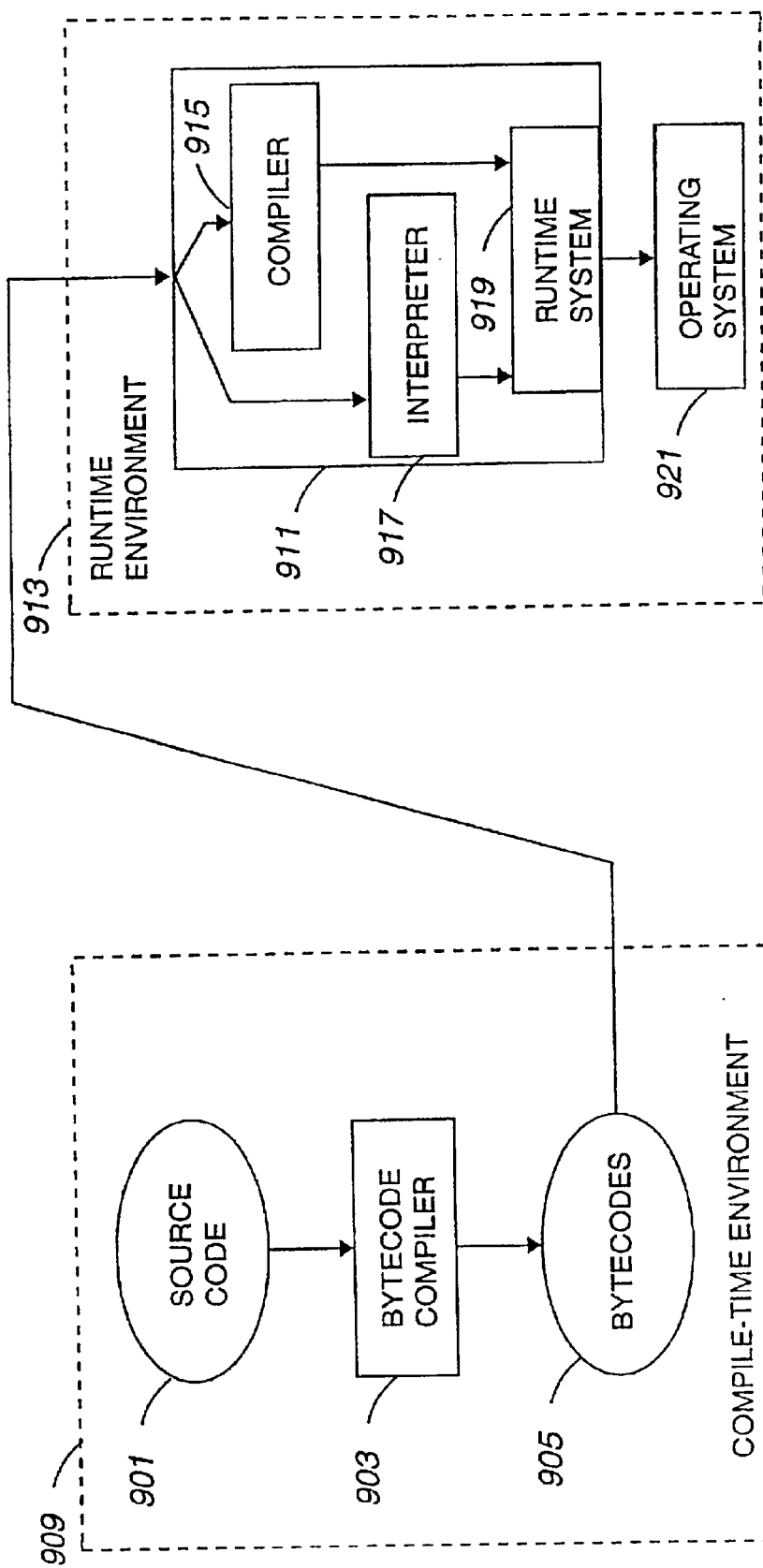
FIG. 9b is a diagrammatic representation of virtual machines supported by the computer system of FIG. 8 described below.

FIG. 9b is a diagrammatic representation of virtual machine 911, such as JVM 907, that can be supported by computer system 800 of FIG. 8. As mentioned above, when a computer program, e.g., a program written in the Java™ programming language, is translated from source to bytecodes, source code 901 is provided to a bytecode compiler 903 within a compile-time environment 903. Bytecode compiler 909 translates source code 901 into bytecodes 905. In general, source code 901 is translated into bytecodes 905 at the time source code 901 is created by a software developer.

Bytecodes 905 can generally be reproduced, downloaded, or otherwise distributed through a network, e.g., through network interface 824 of FIG. 8, or stored on a storage device such as primary storage 804 of FIG. 8. In the described embodiment, bytecodes 903 are platform independent. That is, bytecodes 903 may be executed on substantially any computer system that is running a suitable virtual machine 911. Native instructions formed by compiling bytecodes may be retained for later use by the JVM. In this way the cost of the translation are amortized over multiple executions to provide a speed advantage for native code over interpreted code. By way of example, in a Java™ environment, bytecodes 905 can be executed on a computer system that is running a JVM.

Bytecodes 905 are provided to a runtime environment 913 which includes virtual machine 911. Runtime environment 913 can generally be executed using a processor such as CPU 802 of FIG. 8. Virtual machine 911 includes a compiler 915, an interpreter 917, and a runtime system 919. Bytecodes 905 can generally be provided either to compiler 915 or interpreter 917.

When bytecodes 905 are provided to compiler 915, methods contained in bytecodes 905 are compiled into native machine instructions (not shown). On the other hand, when bytecodes 905 are provided to interpreter 317, bytecodes 305 are read into interpreter 917 one bytecode at a time. Interpreter 917 then performs the operation defined by each bytecode as each bytecode is read into interpreter 917. In general, interpreter 917 processes bytecodes 905 and performs operations associated with bytecodes 905 substantially continuously.

When a method is called from an operating system 921, if it is determined that the method is to be invoked as an interpreted method, runtime system 919 can obtain the method from interpreter 917. If, on the other hand, it is determined that the method is to be invoked as a compiled method, runtime system 919 activates compiler 915. Compiler 915 then generates native machine instructions from bytecodes 905, and executes the machine-language instructions. In general, the machine-language instructions are discarded when victual machine 911 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although the foregoing invention has been described in some detail for purposes of clarity of understanding, it will be apparent that certain changes and modifications may be practiced within the scope of the appended claims. For example, although the invention has been discussed with respect to the mentioned L&Fs, other L&Fs may be suitably implemented without escaping the nature of the present invention. In addition, the platform independent audio apparatus may be any such service and is not restricted to Java. Alternately, a broad range of potential interaction taxonomies for classifying events are obviously applicable and thus the present invention is not limited to any single taxonomy or hierarchy. For example, the audio events may be named and organized according to component and event. Moreover, it should be noted that although the present invention has been illustrated with respect to output-only, non-speech user interface, the present invention is also applicable to support output speech audio types as well as user input interfaces. Accordingly, the present embodiments are to be considered as illustrative and not restrictive, and the invention is not to be limited to the details given herein, but may be modified within the scope and equivalents of the appended claims.

What is claimed is:

1. A platform-independent audio computer service capable of servicing platform dependent audio events on a first and a second platform, the platform-independent audio computer service comprising:

an audio component capable of receiving as input an audio event, the audio event representing an event which requires an audio response, the audio component running on a first platform serviced by the platform independent audio computer service; and a software object representing a set of entries, wherein at least one entry of the set of entries is associated with the audio event and a first theme representing an audio cue that maps to the audio event, the first theme including a first set of platform dependent audio fields, each platform dependent audio field associated with at least one platform dependent audio event of the first platform, wherein the first theme is arranged to permit the emulation of the audio event of the first platform in response to the audio event; and an audio system manager capable of directly or indirectly accessing the software object and audio component, thereby allowing the platform dependent audio event to be emulated using the software object.

2. The audio computer service of claim 1 wherein the audio computer service is implemented in Java programming language.

3. The audio computer service of claim 1 wherein the audio event is a GUI audio event.

4. The audio computer service of claim 1 wherein the first platform is an opening system.

5. The audio computer service of claim 4 wherein the operating system is one of a Windows operating system, a Motif operating system or a Macintosh operating system.

6. The audio computer service of claim 1 wherein the software object is stored in volatile memory.

7. The audio computer service of claim 1 further including a second platform serviced by the computer service.

8. The audio computer service of claim 7 further including a second theme including a second set of platform dependent audio fields.

9. The audio computer service of claim 7 wherein the first and second theme are arranged to permit the emulation of audio events of different graphical user interfaces.

10. The audio computer service of claim 1 further including a Multiplexer.

11. The audio computer service of claim 1 wherein one platform dependent audio field in the first set of platform dependent audio fields includes a pointer.

12. A platform-independent audio computer service comprising:

a system manager;

a component capable of an audio event designed to run on a first platform serviced by the audio computer service; and a software object having a set of entries, wherein at least one entry is associated with the audio event, a first theme and a second theme, the first theme including a first set of platform dependent audio fields, each platform dependent audio field of the first theme associated with at least one audio event, the second theme including a second set of platform dependent audio fields, each platform dependent audio field of the second theme associated with at least one audio event wherein the first and second themes are arranged to permit the emulation of audio events of different graphical user interfaces.

13. A method of servicing platform dependent audio events, by a platform-independent audio computer service, a platform dependent audio field associated with an audio event on a first and a second platform, the method comprising:

providing an audio component capable of receiving as input an audio event, the audio event representing an event which requires an audio response, the audio component running on a first platform serviced by the platform independent audio computer service; and providing a software object representing a set of entries, wherein at least one entry of the set of entries is associated with the audio event and a first theme representing an audio cue that maps to the audio event, the first theme including a first set of platform dependent audio fields, each platform dependent audio field associated with at least one platform dependent audio event of the first platform, wherein the first theme is arranged to permit the emulation of the audio event of the first platform in response to the audio event; and providing an audio system manager capable of directly or indirectly accessing the software object and audio component, thereby allowing the platform dependent audio event to be emulated using the software object.

14. A computer-implemented method of accessing, by a platform independent audio computer service, a platform dependent audio field associated with an audio event from a first platform, the method comprising:

providing a software object representing a set of entries wherein at least one entry of the set of entries is associated hit the audio event and a theme representing an audio cue that maps to the audio event, the theme including a first set of platform dependent audio fields, each platform dependent audio field associated with at least one platform dependent audio event of the first platform, wherein the theme is arranged to permit the emulation of the audio event of the first platform in response to the audio event;

receiving a request for a platform dependent audio function;

importing using the platform-independent audio computer service, a theme corresponding to the platform dependent audio function including at least one platform dependent audio field associated with the platform dependent audio function when the request is received; and referencing the platform dependent audio field corresponding to the platform dependent audio function based on the imported theme.

\* \* \* \* \*

UNITED STATES PATENT AND TRADEMARK OFFICE
CERTIFICATE OF CORRECTION

PATENT NO. : 6,853,868 B1
DATED : February 8, 2005
INVENTOR(S) : Albers et al.

It is certified that error appears in the above-identified patent and that said Letters Patent is hereby corrected as shown below:

Column 3,
Line 53, change "infiastructure" to -- infrastructure --.
Line 56, change "taack" to -- track --.

Column 4,
Line 17, change "GUT object" to -- GUI object --.
Line 23, change "a GUT" to -- a GUI --.

Column 11,
Line 37, change "victual machine" to -- virtual machine --.

Column 12,
Line 28, change "opening system" to -- operating system --.

Column 14,
Line 5, change "associated hit" to -- associated with --.

Signed and Sealed this

Fifth Day of July, 2005

JON W. DUDAS
*Director of the United States Patent and Trademark Office*